US008205207B2

(12) United States Patent
Villarreal et al.

(10) Patent No.: US 8,205,207 B2
(45) Date of Patent: Jun. 19, 2012

(54) METHOD OF AUTOMATED RESOURCE MANAGEMENT IN A PARTITION MIGRATION CAPABLE ENVIRONMENT

(75) Inventors: Marcos A. Villarreal, Austin, TX (US); Dean J. Burdick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1374 days.

(21) Appl. No.: 11/686,388

(22) Filed: Mar. 15, 2007

(65) Prior Publication Data

US 2008/0229031 A1 Sep. 18, 2008

(51) Int. Cl.
    *G06F 9/46* (2006.01)
(52) U.S. Cl. ....................................................... 718/104
(58) Field of Classification Search .................. None
    See application file for complete search history.

(56) References Cited

U.S. PATENT DOCUMENTS

| | | | | |
|---|---|---|---|---|
| 4,843,541 A * | 6/1989 | Bean et al. | ....................... | 710/36 |
| 5,414,851 A | 5/1995 | Brice, Jr. et al. | ............... | 395/650 |
| 5,452,455 A | 9/1995 | Brown et al. | .................. | 395/700 |
| 6,226,734 B1 * | 5/2001 | Kleinsorge et al. | ............. | 712/13 |
| 7,409,487 B1 * | 8/2008 | Chen et al. | ......................... | 711/6 |
| 7,454,516 B1 * | 11/2008 | Weinert et al. | ................ | 709/235 |
| 2003/0061475 A1 | 3/2003 | Gregg et al. | .................. | 713/100 |
| 2003/0115439 A1 | 6/2003 | Mahalingam et al. | ............ | 712/1 |
| 2004/0003063 A1 * | 1/2004 | Ashok et al. | .................. | 709/221 |
| 2005/0071472 A1 * | 3/2005 | Arndt et al. | .................... | 709/226 |
| 2005/0160413 A1 * | 7/2005 | Broussard et al. | ............ | 717/148 |
| 2005/0216720 A1 * | 9/2005 | Michaelis et al. | ................ | 713/2 |
| 2006/0085785 A1 * | 4/2006 | Garrett | ............................ | 718/1 |
| 2006/0277180 A1 * | 12/2006 | Okamoto | ........................ | 707/7 |
| 2007/0180436 A1 * | 8/2007 | Travostino et al. | ........... | 717/138 |
| 2009/0241108 A1 * | 9/2009 | Edwards et al. | .................. | 718/1 |

* cited by examiner

*Primary Examiner* — Emerson Puente
*Assistant Examiner* — Gregory Kessler
(74) *Attorney, Agent, or Firm* — Hamilton & Terrile, LLP; Gary W. Hamilton

(57) ABSTRACT

A method, system and program are disclosed for automatically adjusting the allocation of a plurality of information processing system (IPS) resources among a plurality of logical partitions (LPARs). An LPAR is created on a first central processor complex (CPC) and a first LPAR identifier is generated. A configuration change manager is implemented on the LPAR to communicate changes in the LPAR's identifier to an automated resource manager (ARM). IPS resources are automatically allocated to the LPAR. If the LPAR is migrated a second CPC, a second LPAR identifier is similarly generated, resulting in an LPAR configuration change event. The ARM is notified that the migrated LPAR's identifier has changed and receives the changed LPAR identifier. Comparison operations are performed to determine whether the second LPAR identifier matches the first CPC. If not, resources allocated to the migrated LPAR are released for automated allocation to other LPARs comprising the first CPC.

4 Claims, 4 Drawing Sheets

METHOD OF AUTOMATED RESOURCE MANAGEMENT IN A PARTITION MIGRATION CAPABLE ENVIRONMENT

BACKGROUND OF THE INVENTION

1. Field of the Invention

Embodiments of the disclosure relate in general to the field of computers and similar technologies and, in particular, to software utilized in this field. Still more particularly, it relates to the automated allocation of resources to migrated logical partitions.

2. Description of the Related Art

The growing demand for information management continues to drive the development of progressively more sophisticated information processing environments. In recent years, it has become common to maximize the utilization of information processing system (IPS) resources by logically partitioning the computer platform hardware that comprises a central processor complex (CPC). A logical partition (LPAR) within a CPC allows multiple copies of a single operating system (OS) or multiple heterogeneous operating systems to be simultaneously run on a single IPS platform. An LPAR, within which an operating system image runs, is assigned a non-overlapping subset of the platform's resources. These platform resources include one or more architecturally distinct processors, regions of system memory, and input/output (I/O) adapter bus slots.

Current solutions for partition management enable LPARs to share needed resources in the CPC while maintaining their separately defined computing environments. The resulting efficient access and management of IPS resources not only reduces operations and system management costs, but also maintains needed capacity by responding to the dynamic needs of user applications. Logical partitioning now enables administrators to support dynamic resource allocation across multiple operating system environments by moving processors, memory and I/O between LPARs as their respective workloads change. For example, processors allocated to a test partition can be moved to a production partition in periods of peak demand and then moved back to the test partition when demand subsides. Likewise, memory resources can be moved from an idle partition to a partition experiencing heavy paging. Similarly, underutilized processor, memory and I/O resources can be moved from their respective partitions into a pool of resources for reallocation to newly created partitions. As a result, the implementation of partitioning in IPS environments has now evolved to enable a single, consolidated view, access and utilization of available computing resources in a network, regardless of their location.

Prior art approaches exist for the automated allocation of IPS resources across LPARs within a CPC. For example, an automated resource manager (ARM) can dynamically allocate IPS resources by working collaboratively with a hardware management console (HMC). The HMC creates, starts, stops and terminates partitions and provides the ARM with partition and resource utilization information. By monitoring the provided resource utilization information, the ARM can dynamically reallocate resources from partitions with a lower demand to partitions with a high demand, thereby improving the overall resource utilization of the system. Additional IPS resource management and utilization flexibility can be achieved by migrating LPARS between CPCs, such as in a networked computing environment. For example, workloads can be balanced by migrating an LPAR from a CPC operating at capacity to a CPC with excess capacity. Since IPS resources are constrained to the physical CPC, IPS resources allocated to an LPAR do not migrate with it, freeing them for reallocation to the remaining LPARs. However, since a migration can occur on a live, running partition, the ARM is not aware that the migration has taken place and continues to allocate IPS resources to the partition, even though they are not being used. As a result, the ARM is unable to automatically reallocate these unused IPS resources to other LPARs within the CPC until they are released from their allocation to the migrated partition through manual intervention.

BRIEF SUMMARY OF THE INVENTION

A method, system and program are disclosed for automatically adjusting the allocation of a plurality of information processing system (IPS) resources among a plurality of logical partitions (LPARs). In various embodiments of the invention, a hardware management console (HMC) is implemented on a first central processor complex (CPC) to create a logical partition and generate a first LPAR identifier. A resource configuration manager is then implemented on the LPAR such that changes in configuration, such as a change in the LPAR's identifier, are communicated to an automated resource manager (ARM).

Based on IPS resource utilization information received from the HMC, the ARM automatically allocates IPS resources to the LPAR. If the LPAR is migrated from the first CPC to a second CPC, a second LPAR identifier is generated for the migrated LPAR by an HMC similarly comprising the second CPC. Generation of the second LPAR identifier results in an LPAR configuration change event. Accordingly, the resource configuration manager implemented on the migrated LPAR notifies the ARM comprising the first CPC that the migrated LPAR's identifier has changed. The resource configuration manager then forwards the changed LPAR identifier to the ARM, which performs comparison operations to determine whether the second LPAR identifier matches the first CPC. If it doesn't, then the resources allocated to the migrated LPAR are released for automated allocation to other LPARs comprising the first CPC.

In an embodiment of the invention, the first LPAR identifier comprises a CPC identifier referencing the first CPC and the second LPAR identifier comprises a CPC identifier referencing the second CPC. In this embodiment, the first LPAR identifier is replaced by the second LPAR identifier when the LPAR migrates from the first CPC to the second CPC. When the ARM receives a configuration change event notification and subsequently receives the second LPAR identifier, it is able to determine through LPAR identifier comparison operations that the LPAR no longer comprises the first CPC. As a result, the IPS resources allocated to the migrated LPAR are released for reallocation to other LPARs comprising the first CPC. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
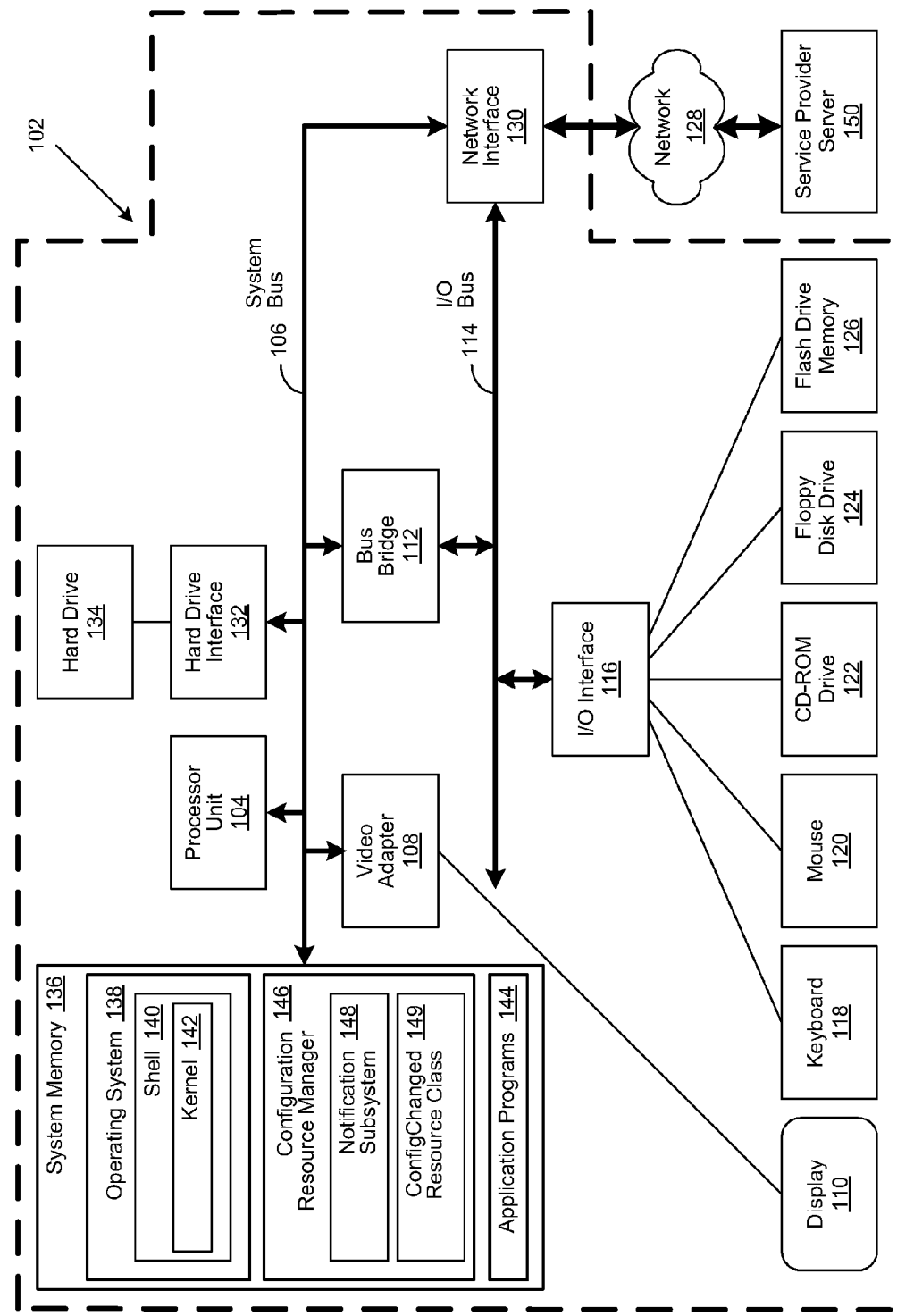
FIG. 1 depicts an exemplary client computer in which the present invention may be implemented.

A method, system and program are disclosed for automatically adjusting the allocation of a plurality of information processing system (IPS) resources among a plurality of logical partitions (LPARs). A hardware management console (HMC) is implemented on a first central processor complex (CPC) to create an LPAR and generate a first LPAR identifier. A resource configuration manager is then implemented on the LPAR to communicate changes in the LPAR's identifier to an automated resource manager (ARM). IPS resources are automatically allocated to the LPAR. If the LPAR is migrated a second CPC, a second LPAR identifier is similarly generated, resulting in an LPAR configuration change event. The ARM is notified that the migrated LPAR's identifier has changed and receives the changed LPAR identifier. Comparison operations are performed to determine whether the second LPAR identifier matches the first CPC. If not, resources allocated to the migrated LPAR are released for automated allocation to other LPARs comprising the first CPC.

As will be appreciated by one skilled in the art, the present invention may be embodied as a method, system, or computer program product. Accordingly, embodiments of the invention may be implemented entirely in hardware, entirely in software (including firmware, resident software, micro-code, etc.), or in an embodiment combining software and hardware. These various embodiments may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device or a magnetic storage device. In the context of this document, a computer-usable or computer-readable medium may be any medium that can contain, or store the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 150 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 150.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and application programs 144.

OS 138 includes a shell 140 for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and application programs 144, including memory management, process and task management, disk management, and mouse and keyboard management.

System memory 136 also includes resource configuration manager 146, which comprises notification subsystem 148 and ConfigChanged resource class 149. Notification subsystem 148 and ConfigChanged resource class 149 includes code for implementing the processes described in FIGS. 2-8 described hereinbelow. In one embodiment, client computer 102 is able to download configuration resource manager 146 from a service provider server 150.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
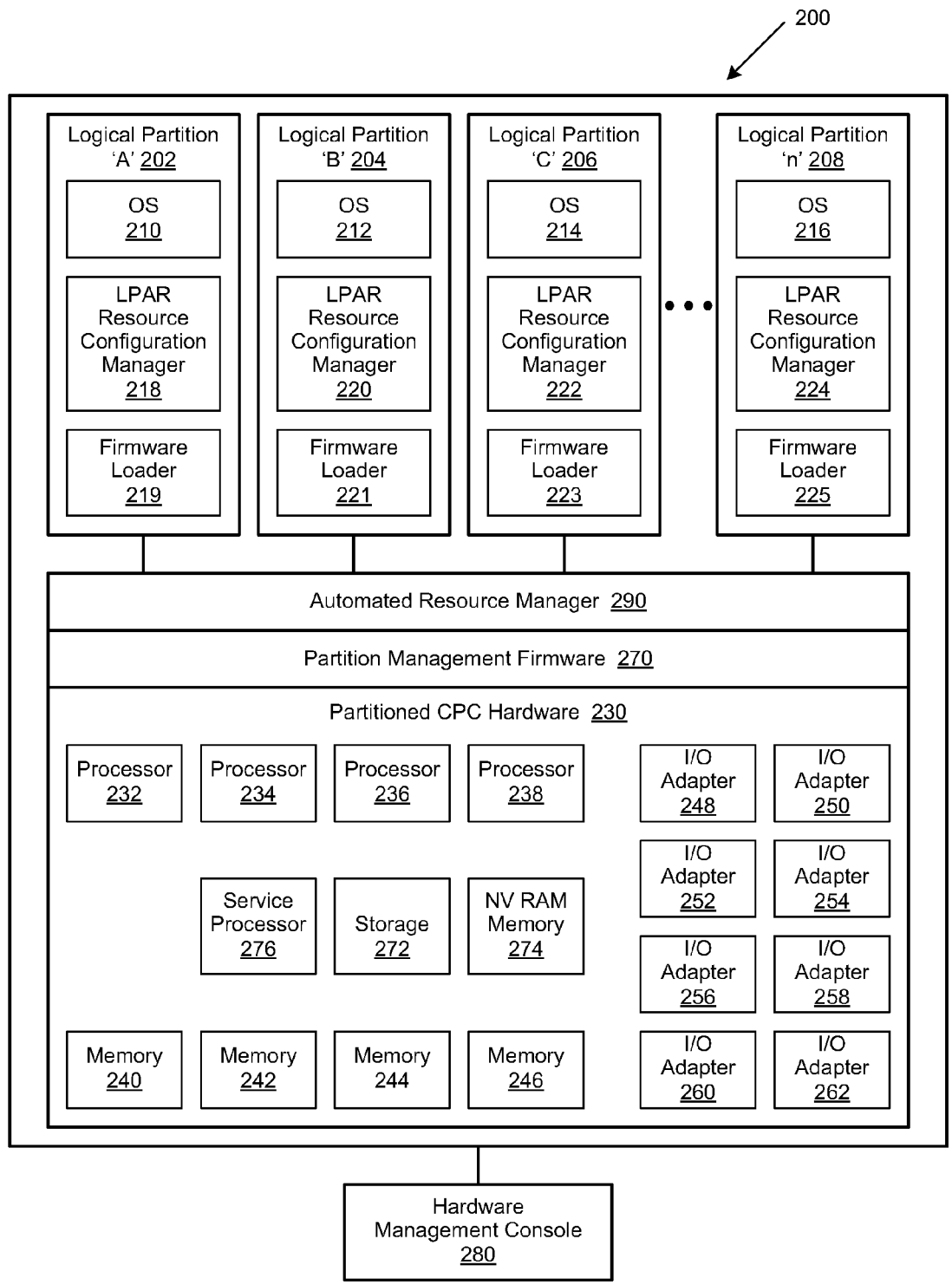
FIG. 2 is a generalized block diagram of an exemplary logical partitioned platform as implemented in accordance with an embodiment of the invention.

FIG. 2 is a generalized block diagram of an exemplary logical partitioned platform 200 as implemented in accordance with an embodiment of the invention. In some embodiments, logical partitioned platform 200 includes partitioned central processor complex (CPC) hardware 230, operating systems 210, 212, 214, 216, and partition management firmware 210. Operating systems 210, 212, 214, 216 may be multiple copies of a single operating system or multiple heterogeneous operating systems simultaneously run on platform 200. Logical partitions (LPARs) 'A' 202, 'B' 204, 'C' 206 through 'n' 208 respectively comprise operating systems 202, 204, 206 through 208 and LPAR resource configuration manager s 218, 220, 222 through 224. These partitions also respectively include firmware loaders 219, 221, 223, and 225. Firmware loaders 219, 221, 223, and 225 may be implemented using IEEE-1275 Standard Open Firmware and runtime abstraction software (RTAS), which is available from International Business Machines Corporation. When LPARs 'A' 202, 'B' 204, 'C' 206 through 'n' 208 are instantiated, a copy of the open firmware is loaded into each partition by the partition management firmware 270. The processors associated or assigned to the partitions are then dispatched to the partition's memory to execute the partition firmware.

Partitioned CPC hardware 230 includes a plurality of processors 232, 234, 236, 238, a plurality of system memory units 240, 242, 244, 246, a plurality of input/output (I/O) adapters 248, 250, 252, 254, 256, 258, 260, 262, and a storage unit 272. Partitioned hardware 230 also includes service processor 276, which may be used to provide services such as processing of errors in the partitions. Each of the processors 232, 234, 236, 238, memory units 240, 242, 244, 246, nonvolatile random access memory (NVRAM) storage 274, and I/O adapters 248, 250, 252, 254, 256, 258, 260, 262 may be assigned to one of multiple partitions within logical partitioned platform 200, each of which corresponds to one of operating systems 210, 212, 214 and 216.

Partition management firmware 270 performs a number of functions and services for partitions 202, 204, 206, and 208 to create and enforce the partitioning of logical partitioned platform 200. Partition management firmware 270 is a firmware-implemented virtual machine identical in operation to the underlying hardware. The partition management firmware 270 is implemented as software stored in a memory chip that holds its content without electrical power. Such memory chips include, for example, read-only memory (ROM), programmable ROM (PROM), erasable programmable ROM (EPROM), electrically erasable programmable ROM (EEPROM), and nonvolatile random access memory (nonvolatile RAM). Accordingly, partition management firmware 270 allows the simultaneous execution of independent OS images 210, 212, 214 and 216 by virtualizing the IPS hardware resources of logical partitioned platform 200.

Operations of the different partitions may be controlled through a hardware management console (HMC) 280. HMC 280 is a separate data processing system from which a system administrator may perform operations including the initial allocation of information processing system (IPS) resources to LPARs 'A' 202, 'B' 204, 'C' 206 through 'n' 208. Automated resource manager (ARM) 290 receives IPS resource utilization information from HMC 280, which is used to allocate IPS hardware resources comprising partitioned CPC hardware 230 across LPARs 'A' 202, 'B' 204, 'C' 206 through 'n' 208 as described in greater detail herein. Changes in the configuration of LPARs 'A' 202, 'B' 204, 'C' 206 through 'n' 208, such as a change in their respective identifier when migrated to a different logical partitioned platform, is communicated to ARM 290 respectively by resource configuration manager s 218, 220, 222 through 224. Upon receipt of such configuration change notification, IPS resources comprising partitioned CPC hardware 230 are released from their allocation to the migrated LPAR for reallocation to the remaining LPARs comprising logical partitioned platform 200.

Figure 3:
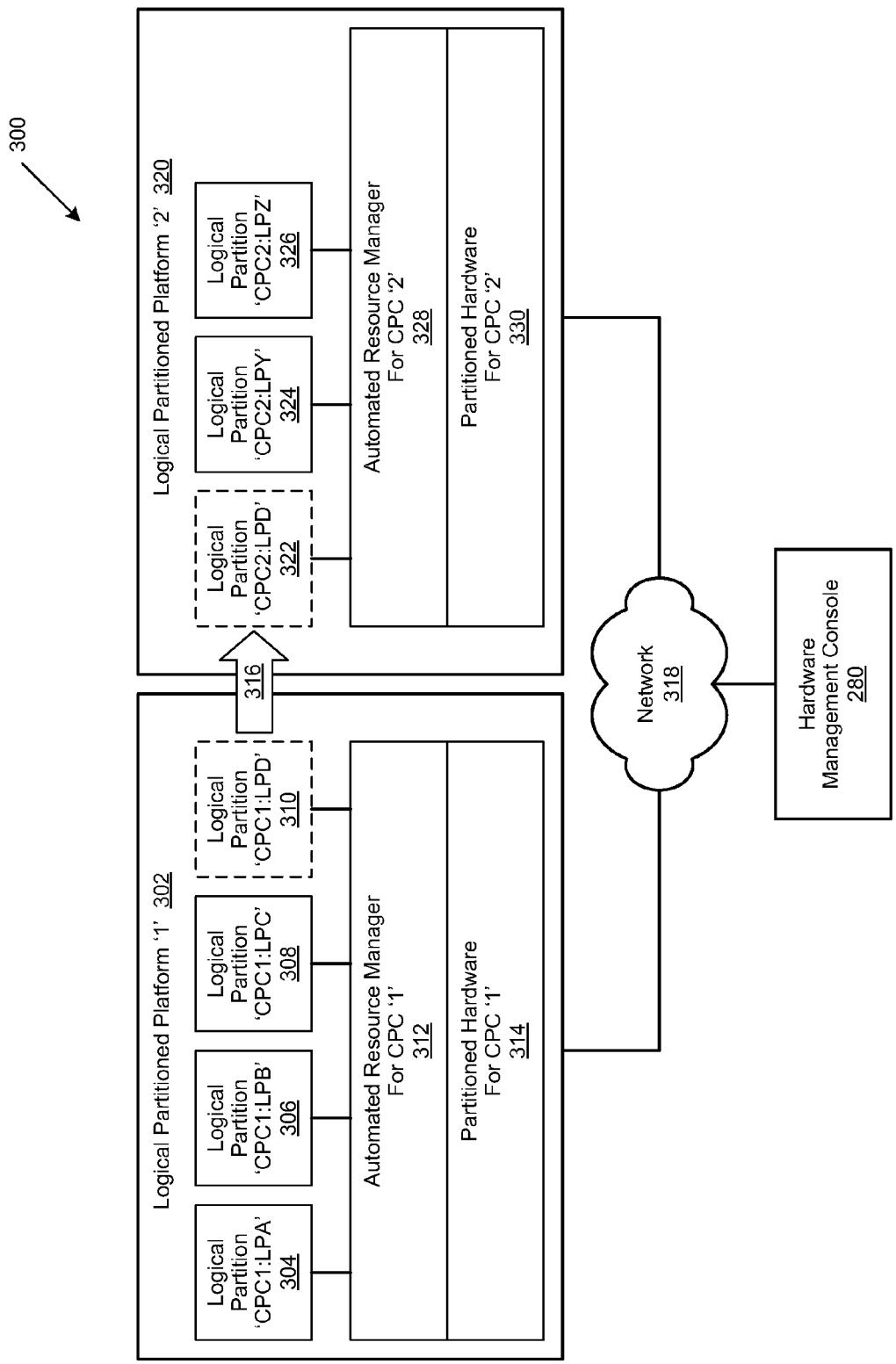
FIG. 3 is a generalized block diagram of the migration of a logical partition (LPAR) from a first logical partitioned platform to a second logical partitioned platform as implemented in accordance with an embodiment of the invention.

FIG. 3 is a generalized block diagram of the migration 300 of a logical partition (LPAR) from a first logical partitioned platform to a second logical partitioned platform as implemented in accordance with an embodiment of the invention. In this embodiment logical partitioned platform '1' 302 comprises partitioned hardware for CPC '1' 314, automated resource manager (ARM) for CPC '1' 312, and LPARs 'CPC1:LPA' 304, 'CPC1:LPB,' 'CPC1:LPC.' Logical partitioned platform '1' 302 also comprises LPAR 'CPC1:LPD' which is migrated 316 to logical partitioned platform '2' 320 where it receives a new LPAR identifier and is referenced as 'CPC2:LPD.'

Once LPAR 'CPC1:LPD' 310 is migrated in step 316 to and becomes 'CPC2:LPD' 322, logical partitioned platform '2' 320 comprises LPARs 'CPC:LPY' and 'CPC:LPZ.' Logical partitioned platform '2' 320 also comprises the ARM for CPC '2' 328 and partitioned hardware for CPC '2' 330. In this embodiment, LPAR 'CPC1:LPD' 310 is migrated in step 316 to CPC '2' 330 via network 318. Network 318 may comprise a local area network based on communication protocols such as Ethernet, a wide area network such as the Internet, or other communications networks operable to transfer LPARs between logical partitioned platforms.

Hardware management console (HMC) 280 manages the creation, activation, operation and termination of LPARs 'CPC1:LPA' 304, 'CPC1:LPB,' 'CPC1:LPC,' 'CPC1:LPD,' 'CPC2:LPD' 322, 'CPC:LPY' and 'CPC:LPZ.' At the time of creation, HMC 280 generates a unique LPAR identifier. In an embodiment of the invention, the unique identifier comprises a reference to the CPC comprising the IPS resources allocated to the created LPAR. For example LPAR identifier 'CPC1:LPA' 304 signifies that the LPAR comprises IPS resources comprising partitioned hardware for CPC '1' 314. Likewise, when LPAR 'CPC1:LPD' 310 is migrated 316 to CPC '2' 330, the HMC 280 generates a new unique identifier, 'CPC2:LPD' 322, signifying that the migrated LPAR now comprises resources comprising partitioned hardware for CPC '2' 330. Similarly, if 'CPC2:LPD' 322 were to be migrated back to logical partitioned platform '2' 302 (not illustrated), the HMC 280 would revert to the LPAR's original identifier, 'CPC1:LPD' 310. The change in the LPAR's identifier would then signify that the LPAR now once again comprises resources comprising partitioned hardware for CPC '1' 314.

Figure 4:
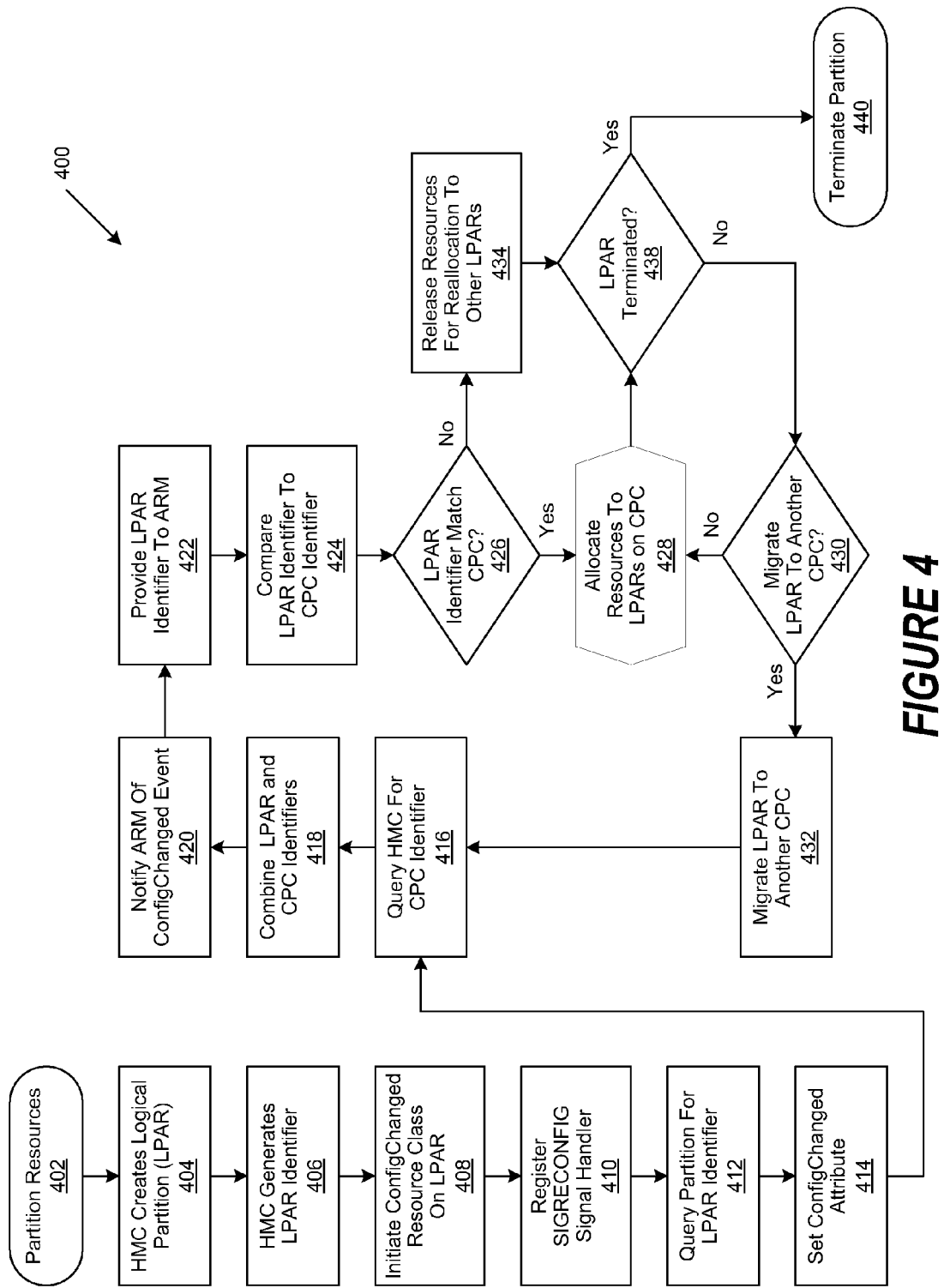
FIG. 4 is a generalized flowchart illustrating the release of resources allocated to an LPAR subsequent to its migration to another logical partitioned platform as implemented in accordance with an embodiment of the invention.

FIG. 4 is a generalized flowchart illustrating the release of resources 400 allocated to an LPAR subsequent to its migration to another logical partitioned platform as implemented in accordance with an embodiment of the invention. In selected embodiments, information processing system (IPS) resources are partitioned beginning in step 402 with the creation of a logical partition (LPAR) through the implementation of a hardware management console (HMC) in step 404. In one embodiment, the HMC is a separate data processing system which performs LPAR administrative functions such as generating a unique LPAR identifier in step 406. Once the LPAR has been created and assigned a unique identifier by the HMC, a ConfigChanged resource class is initiated by a ConfigChanged resource manager as a client on the LPAR in step 408. The main attribute the ConfigChanged resource class exports is the unique LPAR identifier generated by the HMC in step 406. The ConfigChanged resource class registers a signal handler for the SIGRECONFIG handler in step 410.

In step 412, the ConfigChanged resource class queries the LPAR for the unique identifier generate by the HMC in step 406. Once the LPAR's identifier is acquired, the ConfigChanged resource sets the ConfigChanged attribute in step 414, signifying that the LPAR's configuration has been set to reflect the current LPAR identifier. The ConfigChanged resource manager then queries the HMC in step 416 for the identifier of the CPC that will provide IPS resources for allocation to the LPAR. In one embodiment, once the CPC's identifier is acquired from the HMC, it is combined in step 418 with the LPAR identifier generated by the HMC in step 406. For example, combining identifiers for a CPC '1' and an LPAR 'A' could result in an LPAR identifier of 'CPC1:LPA,' signifying that LPAR 'A' comprises IPS resources provided by CPC '1.' Once the combined identifier is generated in step 418, the notification subsystem of the ConfigChanged resource manger notifies the ARM in step 420 that a configuration change event has occurred for the LPAR. The notification subsystem of the ConfigChanged resource manager then provides the combined LPAR identifier to the ARM in step 422.

Upon receipt of the combined LPAR identifier, the ARM performs comparison operations in step 424 to determine whether the received identifier contains references to the CPC providing its allocated IPS resources. If it is determined in step 426 that there is a match between the combined LPAR identifier and the CPC that is providing IPS resources to the LPAR, then the ARM allocates IPS resources in step 428. If it is determined in step 438 that the LPAR has been terminated, then the partition is terminated in step 440. Otherwise, it is then determined in step 430 whether the LPAR is to be migrated to another CPC. If it is determined to not migrate the LPAR to another CPC, then IPS resources continue to be allocated to the LPAR beginning in step 428. However, if it is determined to migrate the LPAR to another CPC in step 430, then the LPAR is migrated to another CPC in step 432.

Once the LPAR is migrated to another CPC in step 432, the HMC is queried in step 416 for the identifier of the CPC receiving the migrated LPAR. Those of skill in the art will realize that in prior art approaches, the ARM of the LPAR's originating CPC would not be aware that LPAR had been migrated to its destination CPC. As a result, the IPS resources provided by the originating CPC to the LPAR would continue to be allocated to the LPAR even though it was no longer running on the originating CPC. The ConfigChanged resource running on the migrated LPAR then queries the HMC in step 416 for the identifier of the destination CPC that will provide IPS resources for allocation to the LPAR and the process continues beginning in step 418.

However, if it is determined in step 426 that there is not a match between the combined LPAR identifier and the CPC that is providing IPS resources to the LPAR, then the ARM releases IPS resources in step 434 for reallocation to other LPARS running on the origination CPC. If it is determined in step 438 that the LPAR has been terminated, then the partition is terminated in step 440. Otherwise, it is determined in step 430 whether the LPAR is to be migrated to another CPC. If not, then IPS resources continue to be allocated in step 428. Otherwise, the LPAR is migrated to another CPC beginning in step 432.

In one embodiment, the LPAR is migrated from its destination CPC back to its originating CPC. In this embodiment, the HMC is queried in step 416 for the identifier of the originating CPC, which is now the new destination for the LPAR. The originating CPC's identifier (which is now the destination CPC for the LPAR) is acquired from the HMC in step 416 and combined in step 418 with the LPAR identifier generated by the HMC in step 406. For example, combining identifiers for the destination CPC '1' (originally the originating CPC) and the original unique identifier for LPAR 'A' could result in an LPAR identifier of 'CPC1:LPA,' signifying that LPAR 'A' now comprises IPS resources provided by destination CPC '1.' Once the combined identifier is generated in step 420, the notification subsystem of the ConfigChanged resource manager notifies the ARM in step 420 that a configuration change event has occurred for the LPAR. The ConfigChanged resource manager then provides the combined LPAR identifier to the ARM in step 422.

Upon receipt of the combined LPAR identifier, the ARM performs comparison operations in step 424 to determine whether the received identifier contains references to the CPC originally providing the LPAR its allocated IPS resources. If it is determined in step 426 that there is a match between the combined LPAR identifier and the CPC that originally provided IPS resources to the LPAR, then the ARM reallocates IPS resources to the returned LPAR in step 428. IPS resource allocation to the LPAR continues thereafter as described in greater detail herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for allocating information processing resources among a plurality of logical partitions (LPARs), comprising:
    allocating a first plurality of information processing system (IPS) hardware resources in a first central processor complex (CPC) to an LPAR;
    generating a first unique LPAR identifier for said LPAR, said first unique LPAR identifier correlated with said first plurality of IPS hardware resources allocated to said LPAR in said first CPC;
    migrating said LPAR from said first CPC to a second CPC;
    allocating a second plurality of IPS hardware resources in a said second CPC to said LPAR;
    generating a second unique LPAR identifier, said second unique LPAR identifier correlated with said second plurality of IPS hardware resources allocated to said LPAR in said second CPC;
    providing a notification of the generation of an LPAR configuration change event to an automated resource manager (ARM), said notification comprising said second unique LPAR identifier; and
    using said ARM to receive said notification of LPAR configuration event and to release said first plurality of IPS hardware resources allocated to said LPAR in said first CPC upon receipt of said notification;
    using a hardware management console (HMC) to generate said first and second unique LPAR identifiers;
    using said ARM to reallocate said released first plurality of IPS hardware resources within the first CPC;
    issuing a query from said ARM to said HMC, upon initiation of said LPAR, to request said first unique LPAR identifier;
    receiving said first unique LPAR identifier at said ARM in response to said query;
    storing said first unique LPAR identifier in said ARM for subsequent comparison operations;
    using said ARM to compare said second unique LPAR identifier to said stored first unique LPAR identifier; and
    releasing said first plurality of IPS hardware resources in said first CPC if said second unique LPAR identifier does not match said stored first unique LPAR identifier.

2. The method of claim 1, further comprising: generating an LPAR configuration change event notification upon detecting the generation of the second unique LPAR identifier.

3. A non-transitory, computer-usable medium embodying computer program code, the computer program code comprising computer executable instructions configured for:
    allocating a first plurality of information processing (IPS) hardware resources in a first central processor complex (CPC) to an LPAR;
    generating a first unique LPAR identifier for said LPAR, said first unique LPAR identifier correlated with said first plurality of IPS hardware resources allocated to said LPAR in said first CPC;
    migrating said LPAR from said first CPC to a second CPC;
    allocating a second plurality of IPS hardware resources in a said second CPC to said LPAR;
    generating a second unique LPAR identifier, said second unique LPAR identifier correlated with said second plurality of IPS hardware resources allocated to said LPAR in said second CPC;
    providing a notification of the generation of an LPAR configuration change event to an automated resource manager (ARM), said notification comprising said second unique LPAR identifier; and
    using said ARM to receive said notification of LPAR configuration event and to release said first plurality of IPS hardware resources allocated to said LPAR in said first CPC upon receipt of said notification;
    using a hardware management console (HMC) to generate said first and second unique LPAR identifiers;
    using said ARM to reallocate said released first plurality of IPS hardware resources within the first CPC;
    issuing a query from said ARM to said HMC, upon initiation of said LPAR, to request said first unique LPAR identifier;
    receiving said first unique LPAR identifier at said ARM in response to said query;
    storing said first unique LPAR identifier in said ARM for subsequent comparison operations;
    using said ARM to compare said second unique LPAR identifier to said stored first unique LPAR identifier; and
    releasing said first plurality of IPS hardware resources in said first CPC if said second unique LPAR identifier does not match said stored first unique LPAR identifier.

4. The non-transitory, computer-usable medium of claim 3, further comprising: generating an LPAR configuration change event notification upon detecting the generation of the second unique LPAR identifier.

* * * * *